Figure 1:
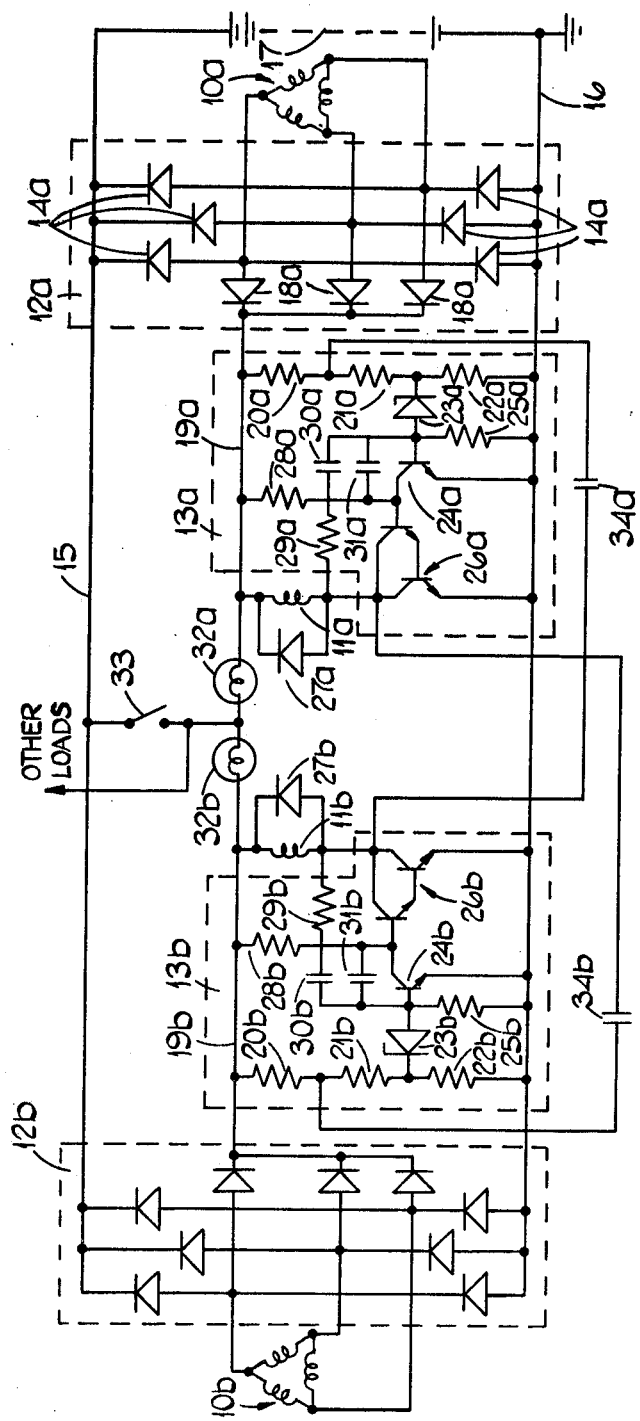

United States Patent [19]

Wiley

[11] 4,156,836
[45] May 29, 1979

[54] BATTERY CHARGING SYSTEM FOR ROAD VEHICLES

[75] Inventor: David Wiley, Walsall, England

[73] Assignee: Lucas Industries, Limited, Birmingham, England

[21] Appl. No.: 859,862

[22] Filed: Dec. 14, 1977

[30] Foreign Application Priority Data

Dec. 18, 1976 [GB] United Kingdom ............... 53121/76

[51] Int. Cl.² ............................................. H02J 7/16
[52] U.S. Cl. ....................................... 320/65; 322/90; 307/84
[58] Field of Search .................... 307/76, 84; 320/57, 320/61, 64, 65, 68; 322/72, 73, 90

[56] References Cited

U.S. PATENT DOCUMENTS

| 3,543,126 | 11/1970 | Nolan et al. | 307/84 X |
| 3,585,358 | 6/1971 | Nilssen | 320/64 X |
| 3,631,258 | 12/1971 | Eisenstadt | 307/84 |

Primary Examiner—Robert J. Hickey
Attorney, Agent, or Firm—Olson, Trexler, Wolters, Bushnell & Fosse, Ltd.

[57] ABSTRACT

A battery charging system includes a pair of alternators having rectified outputs which are connected in parallel. The field currents of the respective alternators are controlled by respective oscillatory switching circuits which are responsive to rectified output voltages from the respective alternators. Each respective switching circuit is coupled to an output voltage sensing circuit of the other alternator, so that oscillatory switching of one switching circuit causes oscillatory switching of the other switching circuit.

6 Claims, 2 Drawing Figures

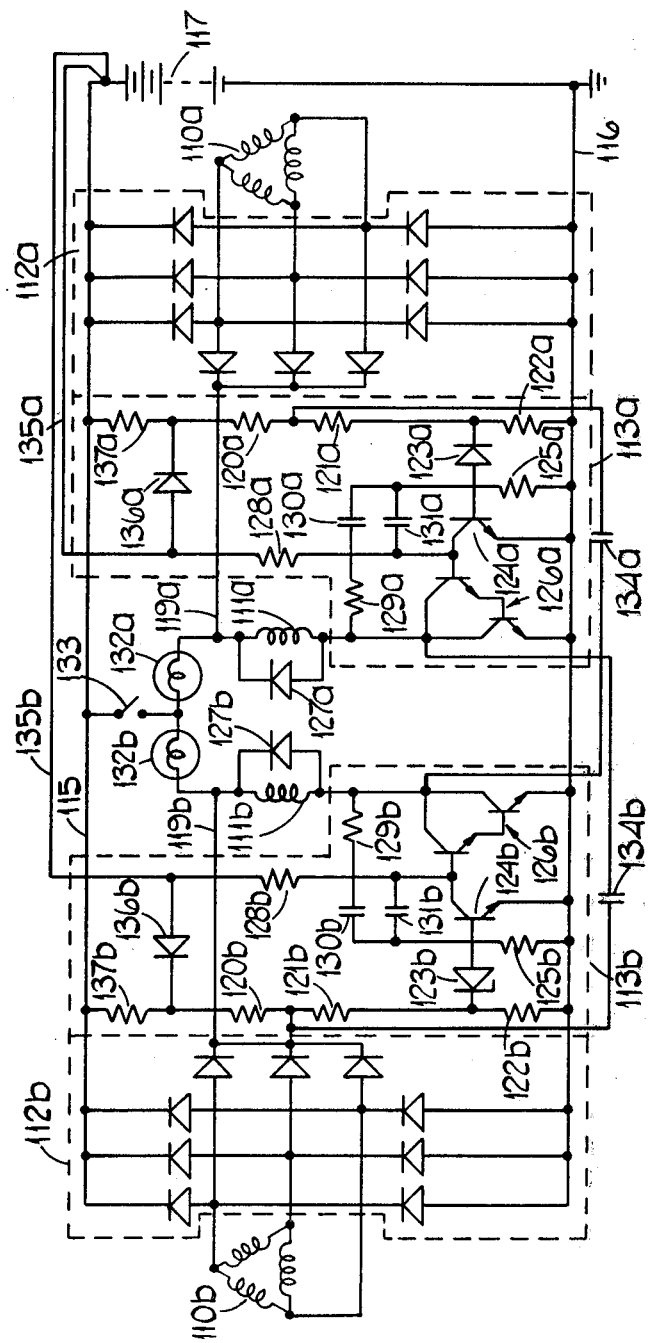

BATTERY CHARGING SYSTEM FOR ROAD VEHICLES

This invention relates to battery charging systems, for road vehicles.

Conventionally an alternator used to charge a road vehicle battery is controlled by a voltage regulator which senses the battery voltage (or the alternator output voltage) and varies the mean current in the field winding of the alternator to maintain a desired voltage level. The alternator output rating is chosen to suit the consumption of the vehicle electrical system, but, economically, it is found that it would be preferable in some applications to use two alternators charging a vehicle battery rather than to produce a larger, more powerful alternator in relatively small quantities.

The control of two alternators in parallel, however, presents some difficulties. If two separate voltage regulators are used it is difficult to match these to one another and the use of a master/slave regulating system can lead to problems if one alternator fails.

According to the invention a battery charging system comprises the combination of a pair of alternators each having a rectifier and an associated field winding, a pair of voltage regulators controlling the field current of each alternator in accordance with the voltage at the output of the associated rectifier, each voltage regulator including a voltage sensing circuit connected across the rectifier output and an oscillatory switching circuit arranged to oscillate between conductive and non-conductive states when the voltage across the voltage sensing circuit exceeds a predetermined value, the field winding of the associated alternator being connected to be controlled by said switching circuit, and cross coupling means connecting the switching circuit of each voltage regulator to the voltage sensing circuit of the other regulator, so that oscillatory switching of one switching circuit causes oscillatory switching of the other switching circuit.

In the accompanying drawings, FIGS. 1 and 2 are electrical circuit diagrams showing two examples of the invention.

Referring firstly to FIG. 1, the battery charging system shown includes two alternators with stator windings 10a, 10b, and field windings 11a, 11b. Each alternator has its own rectifier assembly 12a, 12b, and its own voltage regulator 13a, 13b.

The rectifier assembly 12a includes diodes 14a forming a bridge rectifier connecting the stator winding 10a to positive and negative supply rails 15a, 16 one of which (in this case the rail 16) may be the vehicle chassis. The vehicle battery 17 is connected across the rails 15a, 16. The rectifier assembly 12a also includes three additional diodes 18a which connect the stator winding 10a to an additional rail 19a which provides a supply for the voltage regulator 13a and the field winding 11a.

The regulator 13a includes a voltage sensing circuit which comprises three resistors 20a, 21a and 22a connected in series between the rails 19a and 16, a zener diode 23a with its cathode connected to the junction of the resistors 21a and 22a and its anode connected to the base of an n-p-n transistor 24a which has its emitter connected to the rail 16, a resistor 25a connecting the base of the transistor 24a to the rail 16. The collector of the transistor 24a is connected to the base of a Darlington pair 26a which has its emitter grounded, its collected via the field winding 11a and a recirculation diode 27a in parallel to the rail 19 and its base connected to the rail 19a by a resistor 28a which biases the Darlington pair into full conduction when transistor 24a is off. A resistor 29a and a capacitor 30a are connected in series between the collector of the Darlington pair 26a and the base of the transistor 24a and a capacitor 31a is connected between the collector and base of the transistor 24a.

The voltage regulator 13a operates in known manner to ensure that, when the voltage on rail 19 exceeds a predetermined value at which the zener diode 22a commences supplying current to the base of the transistor 24a the transistors and their feedback circuits provide oscillatory switching of the current in the Darlington pair 26a, between fully conductive and non-conductive states at a frequency determined by the resistor 29a and capacitor 30a, owing to the exponential current growth and decay characteristics of the combination of the winding 11a and the diode 27a, the mark space ratio of oscillatory switching operation varies in accordance with the load on the alternator and the speed of rotation of its field winding. The capacitor 31a suppresses radio frequency emission from the regulator.

The rail 19a is connected by a lamp 32a to one side of an ignition switch 33 the other side of which is connected to the positive terminal of the battery, so that the lamp 32a is lit whenever the switch 33 is closed and the alternator 10a is producing no-output. The lamp current passes through the field winding 11a and the Darlington pair 26a to provide initial excitation of the alternator. A zener diode 9a is connected between the rails 19a and 16 to protect the regulator transistors from any high voltage surges on the rail 19a.

The other regulator 13b is identical to that described and is shown in the drawings with reference numbers having the suffix b.

The two voltage regulators are cross-coupled by a pair of capacitors 34a and 34b. The capacitor 34a is connected between the collector of the Darlington pair 26b of the regulator 13b and the junction of the resistors 20a, 21a in the regulator 13a. The capacitor 34b is likewise connected between the collector of the Darlington pair 26a and the junction of the resistors 20b and 21b.

It may be assumed that the alternators cannot be exactly matched so that in light load conditions the voltage on one of the rails 19a, 19b will be slightly higher than the other, the alternator associated with the lower voltage rail contributing less current to the battery and other loads than the other alternator. As a result the voltage on, say, rail 19a may be such as to commence oscillatory action of the regulator 13a when the voltage on rail 19b is just inadequate to commence oscillatory action of the regulator 13b. The capacitor 34b, however, causes a rise in the voltage at the junction of the resistors 20b and 21b to occur when the Darlington pair 26a switches off and this rise causes the transistors 24b to switch on, turning off the Darlington pair 26b as usual. Similarly when the Darlington pair 26a turns on again, the voltage at the junction of the resistors 20b, 21b will fall and cause the Darlington pair 26b to turn on again. The two Darlington pairs 26a, 26b are thus switched on and off in phase and the required regulation is obtained, and the load is shared substantially equally between the alternators.

The arrangement described enables many fault conditions which would cause a single alternator battery charging system to shut down completely to be accommodated. The system can, in some circumstances, continue to run and provide reduced output, when either one of the alternators has ceased to function.

In the example shown in FIG. 2, the reference numerals of parts common to FIG. 1 are increased by 100.

The basic differences between the circuits of FIGS. 1 and 2, are that the resistors 128a, 128b are not connected to the rails 119a and 119b but by voltage sensing leads 135a and 135b to the positive terminal of the battery 117. The resistors 120a, 120b are not connected to the rails 119a, 119b but by diodes 136a, 136b to the leads 135a, 135b. There are additional resistors 137a, 137b connecting the junctions of the cathodes of the diodes 136a, 136b with the resistors 120a, 120b to the rail 115a, 115b respectively.

Normally, the battery voltage determines the state of the voltage regulators, but, should either of the leads 115a or 115b break or become disconnected the regulators are controlled by the voltage on rails 115a or 115b, the 'set point' of the affected regulator rising slightly in these conditions. With the cross-coupling provided, both leads 115a, 115b would need to be broken before such set-point increase occurred.

It will be appreciated that, for correct operation, the cross coupled pulse via the capacitor 34a or 134a should be shorter than the feedback pulse through capacitor 30a or 130a. To this end the time constant of capacitor 34a with resistor 20a should be substantially shorter than that of capacitor 30a with resistor 29a.

I claim:

1. A battery charging system for a road vehicle comprising in combination a pair of alternators each having a rectifier and an associated field winding, a pair of voltage regulators controlling the field current of each alternator in accordance with the voltage at the output of the associated rectifier, each voltage regulator including a voltage sensing circuit connected across the rectifier output and an oscillatory switching circuit arranged to oscillate between conductive and non-conductive states when the voltage across the voltage sensing circuit exceeds a predetermined value, the field winding of the associated alternator being connected to be controlled by said switching circuit, and cross coupling means connecting the switching circuit of each voltage regulator to the voltage sensing circuit of the other regulator, so that oscillatory switching of one switching circuit causes oscillatory switching of the other switching circuit.

2. A battery charging system as claimed in claim 1 in which said voltage sensing means of each regulator includes in a resistor chain and an input transistor sensitive to the voltage at one point on the resistor chain, said cross-coupling means being connected to a different point on said resistor chain.

3. A battery charging system as claimed in claim 2, in which said cross coupling means comprises a pair of capacitors.

4. A battery charging system as claimed in claim 3, in which each regulator includes the series combination of a feedback resistor and a feedback capacitor connected between the switching circuit and the base of the input transistor, said feedback capacitor/resistor combination having a time constant longer than that of the cross-coupling capacitor with a resistor of the resistor chain.

5. A battery charging system as claimed in claim 4, in which the resistor chain is connected between an auxiliary output of the rectifier, isolated from the main battery charging output thereof, but at the same voltage in normal running conditions, and the vehicle earth.

6. A battery charging system as claimed in claim 4, in which one end of the resistor chain is connected to the vehicle earth and the other end thereof is connected by a further resistor to the main output of the rectifier and by a diode and a separate lead to the battery.

* * * * *